United States Patent [19]

Oliff

[11] 4,077,095
[45] Mar. 7, 1978

[54] PANEL INTERLOCKING MEANS
[75] Inventor: James R. Oliff, Mableton, Ga.
[73] Assignee: The Mead Corporation, Dayton, Ohio
[21] Appl. No.: 759,057
[22] Filed: Jan. 13, 1977
[51] Int. Cl.² .................. B44D 21/00; B65D 5/02; B65D 85/00
[52] U.S. Cl. .................................... 24/204; 206/140; 206/434; 229/40
[58] Field of Search ................ 206/140, 173, 434; 229/45, 39, 40; 24/73 B, 204

[56] References Cited
U.S. PATENT DOCUMENTS

| 2,872,036 | 2/1959 | Forrer | 206/140 |
| 2,898,028 | 8/1959 | Coe | 229/45 |

Primary Examiner—William T. Dixson, Jr.
Attorney, Agent, or Firm—Walter M. Rodgers; Walter A. Rodgers

[57] ABSTRACT

Panel interlocking means for securing a pair of panels in overlapping face contacting relation includes a locking tab struck from one of the panels and arranged to be driven through a locking aperture defined by a retaining tab struck from the other panel and arranged so that its free end engages the locking tab in angularly disposed mutually bracing relation, a securing tab projecting from a transverse edge of the locking aperture remote from the fold line of the retaining tab and disposed within a securing aperture struck from the locking tab and disposed at the base thereof and adjacent the locking tab fold line so as positively to secure the panels together against relative movement.

10 Claims, 6 Drawing Figures

PANEL INTERLOCKING MEANS

One well known panel interlocking means for securing a pair of panels in overlapping face contacting relation is disclosed in expired U.S. Pat. No. 2,786,572 and comprises locking tabs struck from one panel which are arranged to be driven through corresponding locking apertures defined by retaining tabs struck from the other panel. The interlocking means of U.S. Pat. No. 2,786,572 forms a secure and reliable lock for use for example in article carriers of the wraparound type and secures the wrapper blank about a group of articles by operating against the tension of the blank so as to maintain package security. While some article carriers of the wraparound type which incorporate the panel interlocking means of U.S. Pat. No. 2,786,572 are adapted to function as containers for large primary packages, such carriers are not ordinarily especially adapted for use with the currently popular large primary container. In certain instances, large primary packages may be returned to the packager in view of the current emphasis on environmental considerations and for other reasons. The requirement for package integrity requires that panel interlocking means for use in conjunction with wraparound type carriers especially those for large bottles and cans must be secure even though tension of the wrapper blank may be substantial and even though the carrier locks may be weakened by excessive humidity.

According to this invention in one form, panel interlocking means of the type disclosed in U.S. Pat. No. 2,786,572 is improved so as substantially to enhance package security by the use of a securing tab arranged to project from an edge of an aperture defined by a retaining tab and by means of a securing aperture struck from the base of the locking tab and which receives the securing tab when the locking tab is driven through the retaining aperture in conventional fashion.

For a better understanding of the invention reference may be had to the following detailed description taken in conjunction with the accompanying drawing in which FIG. 1 is a perspective view of a can wrapper shown in inverted position so as to expose the interlocking means which normally is formed in the bottom of the carrier;

FIG. 5 is a fragmentary cross sectional view taken along the line designated 5—5 in FIG. 2 and in which

Figure 3:
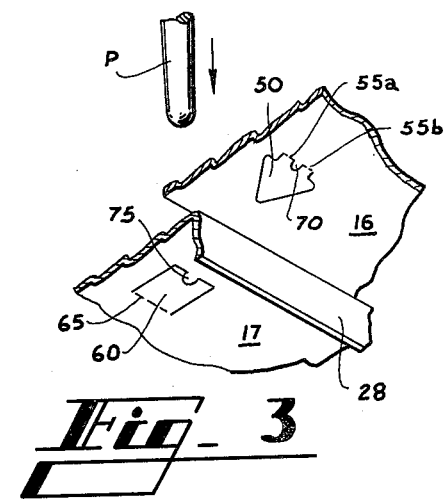
FIG. 3 is a perspective view of panels which are to be interlocked in overlapping relationship prior to engagement of the panels and prior to the initiation of an interlocking operation and in which the panels occupy the same relative positions as are shown in the inverted FIG. 1 where the carton is shown in upside down position.

In the drawings the numeral 1 generally designates a main central panel in which a pair of finger gripping apertures 2 and 3 are formed. As explained panel 1 normally constitutes the top panel of a carrier although in FIGS. 1, 3 and 4 the carton is shown in upside down position.

Side walls 4 and 5 are foldably joined to main panel 1 along interrupted fold lines 6 and 7 respectively and article receiving apertures 8, 9, 10 and 11 are formed along fold line 6 while similar apertures 12, 13, 14 and 15 are formed along fold line 7. The apertures 8–15 receive end portions of the packaged articles such as cans C in a manner well known in the art.

Lap panels 16 and 17 are foldably joined to the edges 18 and 19 of panels 4 and 5 respectively and article receiving apertures 20–23 are formed along fold line 18 while similar apertures 24–27 are formed along fold line 19 and are well known in the art.

For the purpose of separating the articles such as C1 in one row of articles from the articles such as C2 in the other row of articles, a medial keel panel 28 is foldably joined to lap panel 17 along fold line 29 and keel slits 30, 31 and 32 are formed along fold line 29 so as effectively to increase the width of lap panel 17 thereby to enhance locking security in a manner well known in the art.

In order to provide for tightening the blank about a group of articles prior to interlocking the panels 16 and 17, a plurality of tightening apertures 33–36 are formed in the lap panel 16 and similar tightening apertures 37–40 are formed in lap panel 17. As is well known, machine elements enter tightening apertures 33–36 and move inwardly in opposition to the movement of corresponding machine elements which enter tightening apertures 37–40 and function in known manner to tighten the wrapper about the articles C. As is well know, cutaway areas 41–44 are formed along an edge of panel 16 so as to avoid interference with the machine tightening elements which enter tightening apertures 37–40 and similar cutaway areas 45–48 are formed in an edge of medial keel panel 28 so as to avoid interference with the machine elements which enter tightening apertures 33–36.

Figure 6:
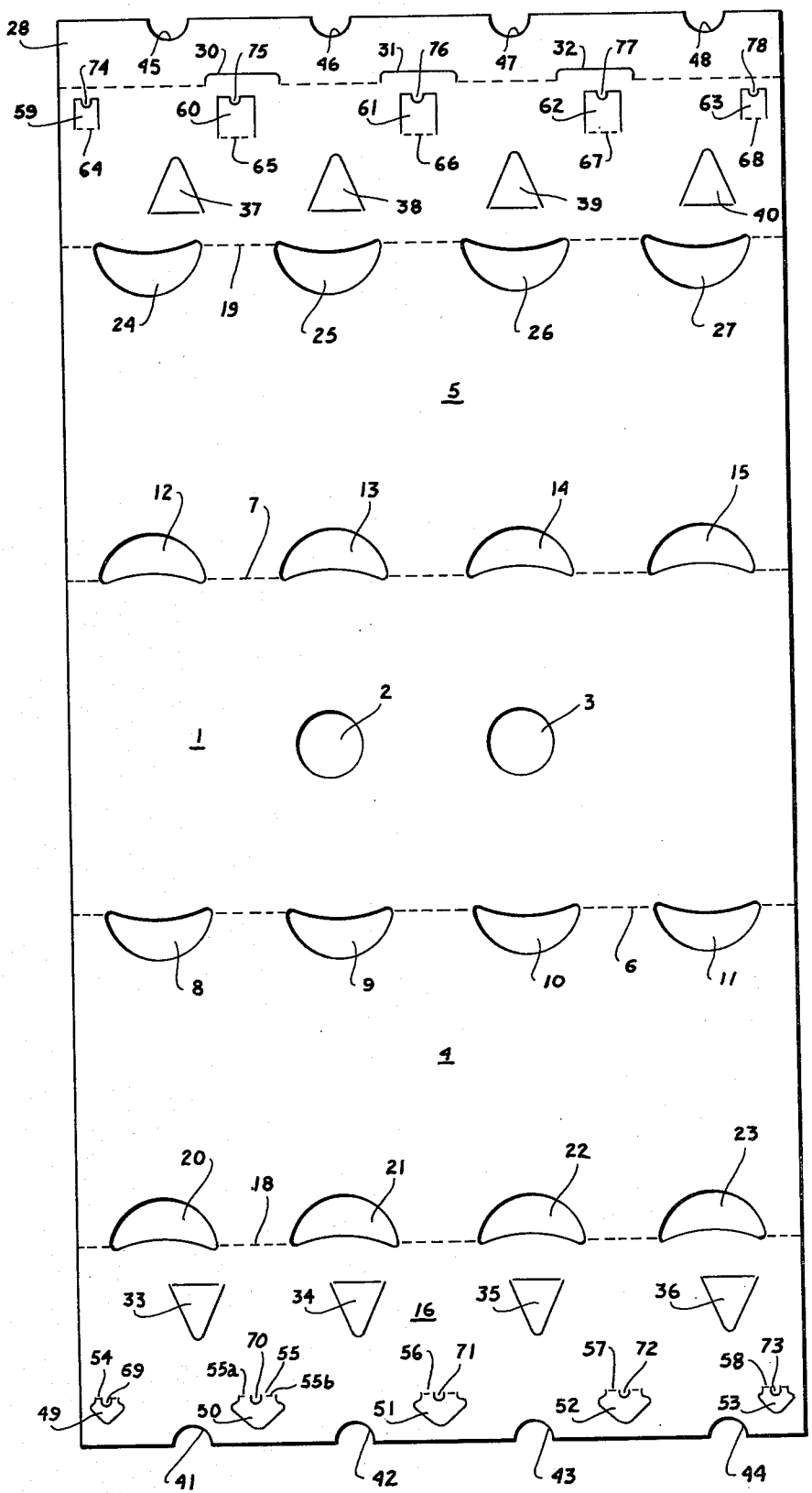
FIG. 6 is a plan view of a blank from which the carrier of FIG. 1 is formed.

For the purpose of securing lap panels 16 and 17 together in overlapping face contacting relation, a plurality of locking tabs 49–53 are struck from lap panel 16 and are foldably joined thereto along transverse fold lines 54–58 located at the base of the locking tabs 49–53 respectively. As shown in FIG. 6, these transverse fold lines are of an interrupted construction as indicated for example at 55a and 55b.

The locking tabs 49–53 cooperate with the locking apertures defined by retaining tabs 59–63 respectively which are struck from lap panel 17 and foldably joined thereto along end edge fold lines 64–68 respectively.

The structure as described above except for the interrupted fold lines such as 55a and 55b is substantially in accordance with the prior art such as is represented by the aforementioned U.S. Pat. No. 2,786,572.

According to this invention, securing apertures such as are designated by the numerals 69–73 are formed in the locking tabs 49–53 respectively.

Formed in lap panel 17 are securing tabs 74–78 and form extensions of lap panel 17 which project from the transverse end edges of the locking apertures defined by retaining tabs 59–63 respectively.

Figure 1:
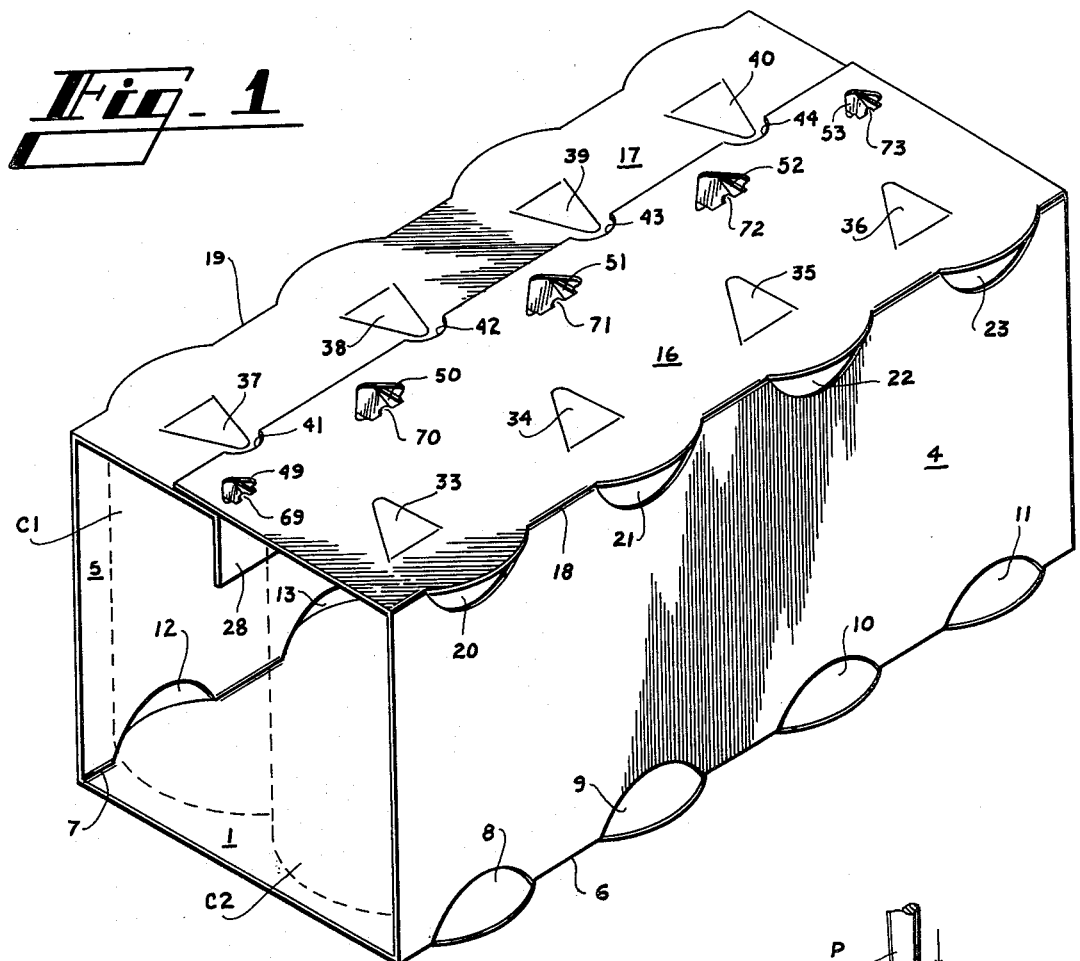
Figure 2:
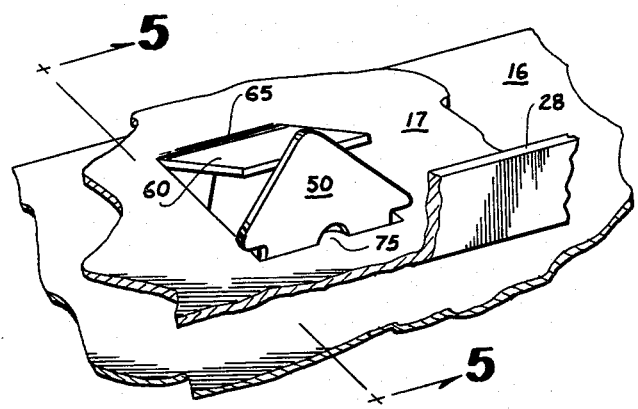
FIG. 2 is an enlarged perspetive fragmentary view of one locking tab and its associated retaining tab together with the securing tab and securing aperture formed according to this invention and with the parts shown in locked condition.
Figure 5:
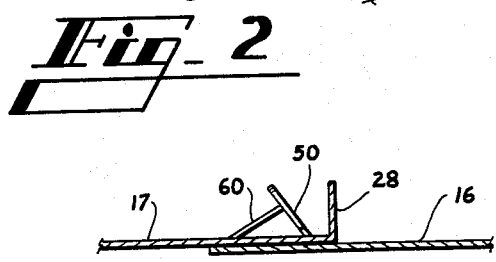
Figure 4:
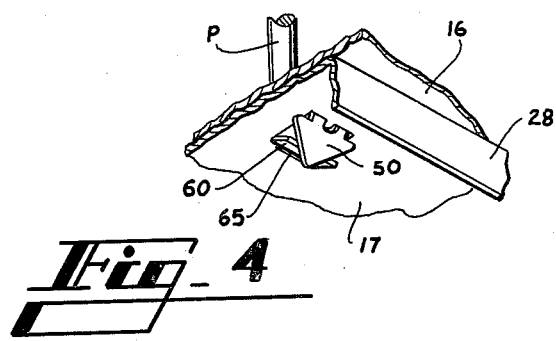
FIG. 4 is a view similar to FIG. 3 but which shows the panels in fully interlocked condition.

With the wrapper blank properly tightened about the group of articles C, the locking tabs 50–53 are engaged by locking plungers such as that schematically represented in FIGS. 1 and 4 at P and are driven through the locking apertures defined by retaining tabs 59–63 respectively. This action swings the retaining tabs 59–63 about their end edge fold lines 64–68 respectively and causes the free ends of the retaining tabs to engage the respective locking tabs to hold these tabs in angularly disposed braced relationship as is shown in FIGS. 2, 4 and 5. The security of this braced relationship is considerably enhanced by the structure disclosed and claimed in U.S. patent application Ser. No. 759,116 filed Jan. 13, 1977 and owned by the assignee of this application.

Simultaneously with the performance of the locking operation by driving the locking tabs through the locking apertures, the securing tabs such as are designated by the numerals 74–78 inclusive are inserted into the securing apertures 69–73 respectively and serve to maintain the wrapper in locked condition. The securing tabs and their associated securing apertures serve to maintain lock security even though the fold lines such as 54–58 at the base of the locking tabs 49–53 respectively tend to "roll" or to shift position along their associated locking tabs. The tendency of the locking tab fold lines 54–58 to "roll" or to shift position from the base of the locking tab to a position somewhat removed from the base or from the normal disposition of the fold line sometimes is due to high humidity conditions which tend to weaken or to soften the material from which the wrapper is made such as paperboard.

While the securing apertures 69–73 preferably are disposed approximately midway between the ends of the interrupted fold lines 54–58, these apertures could be located at some other position along these fold lines and, if desired, more than one securing aperture such as 69–73 could be employed. Of course corresponding securing tabs such as 74–78 inclusive would be utilized so as to match the disposition of the apertures 69–73 respectively both as to position and number.

From the description above it is apparent that the securing tabs such as 74–78 or their equivalent in association with the securing apertures 69–73 or their equivalents serve to insure lock security even though ambient conditions are characterized by a high degree of humidity or in the event some other condition may occur which tends to shift the position of the fold lines such as 54–58 inclusive. In addition the securing tabs and apertures tend to enhance the bracing action of the retaining tabs by limiting relative movement between panels such as 16 and 17 and generally contribute to positive lock security.

The embodiments of the invention in which an exclusive property or privilege is claimed are defined as follows:

1. An arrangement for interlocking a pair of panels in overlapping relation, said arrangement comprising a locking tab having shoulders projecting laterally from its sides and being struck from one of said panels and foldably joined thereto at its base, a retaining tab struck from the other of said panels and foldably joined thereto and defining a locking aperture in said other panel, a securing tab forming a projection of said other panel along a transverse edge of said locking aperture adjacent the free end of said retaining tab, and a securing aperture formed in said locking tab for receiving said securing tab when said locking tab is driven through said locking aperture and into a position of angular relation to said one panel.

2. An arrangement according to claim 1 wherein said securing tab is disposed approximately midway between the ends of said transverse edge of said locking aperture.

3. An arrangement according to claim 1 wherein said securing aperture is disposed approximately midway between the sides of said locking tab.

4. An arrangement according to claim 1 wherein said securing tab is struck from said retaining tab.

5. An arrangement according to claim 1 wherein the base of said locking tab is disposed adjacent said transverse edge of said locking aperture.

6. An arrangement for interlocking a pair of panels in overlapping relation, said arrangement comprising a locking tab having transverse shoulders projecting from its side edges and being struck from one of said panels and foldably joined thereto at its base, a retaining tab struck from the other of said panels and foldably joined thereto and defining a locking aperture in said other panel, at least one securing tab forming a projection of said other panel along a transverse edge of said locking aperture adjacent the free end of said retaining tab, and at least one securing aperture formed in said locking tab adjacent its base for receiving said securing tab when said locking tab is driven through said locking aperture and into a position of angular relation to said one panel.

7. An arrangement according to claim 6 wherein said securing tab is disposed approximately midway between the ends of said transverse edge of said locking aperture and wherein said securing aperture is disposed approximately midway between the side edges of said locking tab.

8. An arrangement according to claim 6 wherein said side edges of said locking tab are approximately parallel to each other and wherein said locking aperture is of generally rectangular configuration.

9. An arrangement for interlocking a pair of panels in overlapping face contacting relation, said arrangement comprising a locking tab struck from one of said panels and having transverse shoulders projecting from generally parallel side edges respectively and being foldably joined to said one panel, a generally rectangular retaining tab struck from the other of said panels and foldably joined thereto along an end edge thereof and defining a locking aperture in said other panel, at least one securing tab forming a projection of said other panel along a transverse edge of said locking aperture remote from said end edge, and at least one securing aperture formed in the base of said locking tab for receiving said securing tab when said locking tab is driven through said locking aperture and with its base disposed adjacent said transverse edge of said locking aperture and with said locking and retaining tabs disposed in angular mutually braced relation to each other.

10. An arrangement for interlocking a pair of panels in overlapping relation, said arrangement comprising a locking tab having shoulders projecting laterally from its sides and being struck from one of said panels and being foldably joined thereto at its base, a locking aperture formed in the other of said panels, a securing aperture formed in said locking tab adjacent its base, and a securing tab forming a projection of said other panel along an edge of said locking aperture, said locking tab and said locking aperture being in general coincidence and said securing aperture being adjacent said securing tab so that said securing tab enters said securing aperture in coordination with entry of said locking tab into said locking aperture.

* * * * *